United States Patent [19]

Ellison-Hayashi et al.

[11] Patent Number: 5,330,937
[45] Date of Patent: * Jul. 19, 1994

[54] BORON SUBOXIDE MATERIAL AND METHOD FOR ITS PREPARATION

[75] Inventors: Cristan Ellison-Hayashi; Morteza Zandi; Dinesh K. Shetty; Peter Kuo, all of Salt Lake City, Utah; Russell Yeckley, Oakham; Frank Csillag, Southboro, both of Mass.

[73] Assignee: Norton Company, Worcester, Mass.

[*] Notice: The portion of the term of this patent subsequent to Aug. 4, 2009 has been disclaimed.

[21] Appl. No.: 920,357

[22] Filed: Jul. 28, 1992

Related U.S. Application Data

[63] Continuation-in-part of Ser. No. 729,467, Jul. 12, 1991, Pat. No. 5,135,892.

[51] Int. Cl.$^5$ .................. C01B 35/10; C04B 35/00
[52] U.S. Cl. ............................. 501/1; 423/278
[58] Field of Search .................. 501/1; 423/278

[56] References Cited

U.S. PATENT DOCUMENTS

| | | | |
|---|---|---|---|
| 1,105,388 | 7/1914 | Weintraub | 423/278 |
| 3,440,312 | 4/1969 | Alliegro . | |
| 3,660,031 | 5/1972 | Holcombe, Jr. et al. | 423/278 |
| 3,673,118 | 6/1972 | Mandorf, Jr. et al. . | |
| 3,816,586 | 6/1974 | Goosey . | |
| 4,446,100 | 5/1984 | Adlerborn et al. . | |
| 5,135,892 | 7/1992 | Ellison-Hayashi et al. | 501/1 |

FOREIGN PATENT DOCUMENTS 574609 4/1959 Canada .................. 423/278

OTHER PUBLICATIONS

R. A. Pasternak, "Crystallographic Evidence for the Existence of B70", Acta Cryst. 12 (1959), 612.

S. Laplaca, B. Post, "The Boron Carbide Structure Type", Planseeberichte Fur Pulvermetallurgie, Bd 9, 1961.

H. F. Rizzo, W. C. Simmons, and H. O. Bielstein, "The Existence and Formation of the Solid B60", Journal of the Electrochemical Society, Jan. 1963.

F. A. Halden, R. Sedlacek, "Growth and Evaluation of Boron Suboxide and Zirconium Dioxide Single Crystals", Stanford Research Institute Menlo Park, Calif., Jan. 1963, National Technical Information Service AD 299-297.

H. Tracy Hall and Lane A. Compton, "Group IV Analogs and High Pressure High Temperature Synthesis of B20", Inorg. Chem. 4 (1965) 1213.

W. C. Simmons, "Progress and Planning Reporting on Boron Suboxide B60" Air Force Materials Laboratory, Mar., 1968.

H. Werheit, P. Runow, and H. G. Leis, "On Boron-Suboxide Surface Layers and Surface States of B-Rhombohedral Boron", Phys. Stat. Sol. (a) 2, K125 (1970).

E. V. Zubova, K. P. Burdina, "Synthesis of B60 Under Pressure", Dokl. Akad. Nauk. SSR, 197 (5) (1971) 1055-1056 (with English Translation).

C. E. Holcombe, Jr., and O. J. Horne, Jr., "Preparation of Boron Suboxide, B$_7$O", Journal of the American Ceramic Society—Discussions and Notes, vol. 55, No. 2 (1971) 106.

(List continued on next page.)

Primary Examiner—Wayne Langel
Attorney, Agent, or Firm—Brian Kolkowski

[57] ABSTRACT

A superhard form of boron suboxide comprises at least about 95% by weight $B_6O$ and has a $KNH_{100}$ value of at least about 3800 kg/mm$^2$. In a preferred embodiment, the boron suboxide has an average grain size of about 0.1-40 microns. A method for forming the superhard boron suboxide comprises mixing boron oxide ($B_2O_3$) and boron powder and subjecting the mixture to a temperature of 1500° C. to about 2,200° C. and a pressure sufficient to produce the superhard boron suboxide. The superhard boron suboxide may be made by this method with or without a sintering aid being present in the mixture of boron and boron oxide.

19 Claims, 12 Drawing Sheets

OTHER PUBLICATIONS

D. R. Petrak, R. Ruh, B. F. Goosey, "Preparation and Characterization of Boron Suboxide", National Bureau of Standards Special Publication 364, Solid State Chemistry Proceedings of 5th Materials Research Symposiums, issued Jul. 1972.

W. H. Rhodes, A. J. DeLai, "Research on Development and Fabrication of Boron Suboxide Specimens," AVCO Corp., prepared for: Air Force Laboratory, Aug., 1972, National Technical Information Service AD 75 1980.

R. R. Petrak, Tobert Ruh, and G. R. Atkins, "Mechanical Properties of Hot-Pressed Boron Suboxide and Boron", Ceramic Bulletin, vol. 53, No. 8 (1974), 569-573.

P. M. Bills and D. Lewis, "Non-stoichiometry of Boron Suboxide (B60)", Journal of the less Common Metals, 45 (1976) 343-345.

V. S. Makarov and Ya. A Ugai, "Thermochemical Study of Boron Suboxide B60", Journal of the Less Common Metals, 117 (1986), 277-281.

C. Brodhag and F. Thevenot, "Hot Pressing of Boron Suboxide B12O2", Journal of the Less-Common Metals, 117, 1-6.

Tadashi Endo, Tsugio Sato, Masahiko Shimada, "High-pressure Synthesis of B2O with diamond-like structure", Journal of Materials Science Letters 6 (1987), 683-685.

David Emin, "Icosahedra Boron-Rich Solids", Physics Today, Jan. 1987.

Andrzej Badzian, "Superhard Material Comparable in Hardness to Diamond", Appl. Phys. Lett. 53(25), Dec. 19, 1988.

W. E. Moddeman, A. R. Burke, W. C. Bowling and D. S. Foose "Surface Oxides of Boron and B12O2 as Determined by XPS" Surface and Interface Analysis, vol. 14, No. 5, May, 1989, pp. 224-232.

M.Ch. Tushisnvili, G. V. bsagareishvili, and D.Sh. Tsagareishvili "Production of Superhard Material-Boron Suboxide and its thermoelastic properties" Fourth Int. Conf. on the Science of Hard Materials (Madeira, 1991) (with English Abstract).

BORON SUBOXIDE MATERIAL AND METHOD FOR ITS PREPARATION

REFERENCE TO RELATED APPLICATION

This is a continuation-in-part of U.S. application Ser. No. 07/729,467 filed Jul. 12, 1991, now U.S. Pat. No. 5,135,892 which issued Aug. 4, 1992.

BACKGROUND OF THE INVENTION

The invention relates to a novel boron suboxide material and to a method for its preparation. More particularly, the present invention relates to a new boron suboxide material which is much harder than boron suboxides previously reported, and to a method for preparing the new boron suboxide material.

A great deal of research has been devoted to developing synthetic superhard materials which have hardness values approaching that of diamond. The best known of these synthetic superhard materials is cubic boron nitride (cBN). Other very hard binary and ternary compounds made from light elements such as boron, nitrogen, oxygen, aluminum, silicon and phosphorous may exist. Among these, the compounds $C_3N_4$, BNC, BPN, $B_4C$ and BP may be mentioned. Another of these compounds which has been reported as having high hardness values is boron suboxide.

Boron normally has a valence of 3 and reacts with oxygen to form boron oxide having the stoichiometric formula $B_2O_3$. Under suitable conditions, boron may react with oxygen and form compounds in which boron exhibits a valence less than 3. Powders of nominal composition $B_3O$, $B_4O$, $B_6O$, $B_7O$, $B_8O$, $B_{12}O$, $B_{15}O$, and $B_{18}O$ have been reported as being formed by reacting elemental boron (B) with boron oxide ($B_2O_3$) under suitably high pressure and temperature conditions. For purposes of this disclosure, the term "boron suboxide" refers to boron/oxygen binary compounds wherein boron has a valence less than 3. Since different varieties of boron suboxide have been reported by others, boron suboxide will be generally designated with the chemical formula $B_xO$.

The formation of boron suboxide ($B_xO$) and a description of its properties have been extensively reported in the literature. Most of the reports in the literature attribute the formula $B_6O$ or $B_7O$ to the boron suboxide being investigated. In some cases, the boron suboxide formed and the material being investigated may consist of more than one phase. In U.S. Pat. No. 3,660,031 (Holcombe, Jr., et. al.), a method of preparing a boron suboxide material is disclosed. According to this patent, the boron suboxide material is formed by reducing zinc oxide with elemental boron at a temperature in the range of 1,200° C.–1,500° C. The boron suboxide produced by this method is reported as having the formula $B_7O$. It is also characterized as having an average hardness value as measured with a Vickers indentor under a 100g load ($VHN_{100}$) of 3,820 kg/mm² and a density of about 2.60g/cc. The material is described as highly refractory, and suitable for use on surfaces subject to abrasion, e.g., grinding wheels, drill bits, machine tools, etc., and in structures employed in high temperature applications.

In U.S. Pat. No. 3,816,586 (Goosey), a method of fabricating boron suboxide products is disclosed. According to this patent, a mixture of elemental boron and boron oxide is cold pressed in a tantalum lined metal die. After the pressure on the compacted mixture is released, it is coated with a mixture of boron nitride and boron oxide, and is subjected to a second pressing step while heating at a temperature sufficient to melt the boron oxide in the compacted mixture. This is followed by a cooling step and another hot pressing step. The boron suboxide product made by this method is reported as being a smooth, sound boron suboxide article, free of flaws and contaminants, and suitable for a variety of applications, e.g., in cutting tools, ceramic bearings, and grinding media. Upon analysis, the boron suboxide product gave 80.1 wt. % boron and 19.9 wt. % oxygen which corresponds to the stoichiometry of $B_6O$. It was also reported as having a density of 2.60 g/cc and a Knoop hardness under a 100g load ($KHN_{100}$) of 3000 kg/mm².

Other reports on methods of preparing boron suboxide and the properties of this material are the following:

1. R. R. Pasternak, "Crystallographic Evidence for the Existence of $B_7O$", Acta Cryst. 12 (1959), 612;
2. S. LaPlaca, B. Post, "The Boron Carbide Structure Type", Planseeberichte Fur Pulvermetallurgie, Bd, 9, 1961;
3. H. F. Rizzo, W. C. Simmons, and H. O. Bielstein, "The Existence and Formation of the Solid $B_6O$", Journal of the Electrochemical Society, Jan. 1963;
4. F A. Halden, R. Sedlacek, "Growth and Evaluation of Boron Suboxide and Zirconium Dioxide Single Crystals" Stanford Research Institute, Menlo Park, Ca., January 1963;
5. H. Tracy Hall and Lane A. Compton, "Group IV Analogs and High Pressure, High Temperature Synthesis of $B_2O$", Inorg. Chem. 4 (1965) 1213;
6. W. C. Simmons, "Progress and Planning Report on Boron Suboxide $B_6O$", Air Force Materials Laboratory, March, 1968;
7. H. Wrerheit, P. Runow, and H. G. Leis, "On Boron-Suboxide Surface Layers and Surface States of B-Rhombohedral Boron", Phys. Stat. Sol. (a) 2, K125 (1970);
8. E. V. Zubova, K. P. Burdina, "Synthesis of $B_6O$ Under Pressure", Dokl. Akad. Nauk. SSR, 197 (5) (1971) 1055–1056;
9. C. E. Holcombe, Jr., and O. J. Horne, Jr., "Preparation of Boron Suboxide, $B_6O$", Journal of the American Ceramic Society—Discussions and Notes, Vol. 55, No. 2 (1971) 106;
10. D. R. Petrak, R. Ruh, B. F. Goosey, "Preparation and Characterization of Boron Suboxide" National Bureau of Standards Special Publication 364, Solid State Chemistry, Proceedings of 5th Materials Research Symposiums, issued July 1972;
11. W. H. Rhodes, A J DeLai, "Research on Development and Fabrication of Boron Suboxide Specimens,"0 AVCO Corp., prepared for: Air Force Materials Laboratory, August, 1972;
12. R. R. Petrak, Robert Ruh, and G. R. Atkins, "Mechanical Properties of Hot-Pressed Boron Suboxide and Boron" Ceramic Bulletin, Vol. 53, No. 8 (1974), 569–573;
13. P. M. Bills and D. Lewis, "Non-stoichiometry of Boron Suboxide ($B_6O$)", Journal of the Less Common Metals, 45 (1976) 343–345;
14. V. S. Makarov and Ya. A Ugai, "Thermochemical Study of Boron Suboxide $B_6O$", Journal of the Less Common Metals, 117 (1986), 277–281;

15. C. Brodhag and F. Thevenot, "Hot Pressing of Boron Suboxide $B_{12}O_2$", Journal of the Less-Common Metals, 117 (1986), 114 6;
16. Tadashi Endo, Tsugio Sato, Masahiko Shimada, "High-pressure synthesis of $B_2O$ with diamond-like structure", Journal of Materials Science Letters 6 (1987), 683–685;
17. David Emin, "Icosahedra Boron-Rich Solids" Physica Today, January, 1987.
18. Andrzej Badzian, "Superhard Material Comparable in Hardness to Diamond" Appl. Phys. Lett. 53(25), 19 Dec 1988;
19. W. E. Moddeman, A. R. Burke, W. C. Bowling and D. S. Foose "Surface Oxides of Boron and $B_{12}O_2$ as Determined by XPS" Surface and Interface Analysis, v. 14 n5, May, 1989, p. 224–232.

All of the aforementioned patents and publications are incorporated herein by reference.

These publications and patents are in agreement that boron suboxide compounds can be produced according to the following chemical equation:

$$(3x-2)B + B_2O_3 \rightarrow B_xO \qquad (1)$$

at moderately high pressures (e.g., 1,000 to 6,000 psi) and moderately high temperatures (e.g., 1,400° C. to 2,200° C.). The specific form of $B_xO$ actually produced depends on the process conditions and the ratio of elemental boron to boron oxide loaded into the reaction cell. Alternatively, boron suboxide compounds may be produced according to the following chemical equation:

$$B + MO \rightarrow B_xO + M \qquad (2)$$

wherein M=Mg or Zn, at temperatures ranging from 1200° C. to 1500° C. without applied pressure. Depending on the starting proportions of boron and metal oxide, the formula $B_6O$ has been attributed most frequently to the boron suboxide compound formed, although some researchers report the formation of $B_7$ and other boron/oxygen compounds.

Generally, the hardness and density values reported for boron suboxide in all of the aforementioned publications have been in good agreement. Average $KHN_{100}$ values of 3400 to 3600 kg/mm2 were reported by Simmons, and $KHN_{100}$ values of 3400 to 3500 kg/mm2 were reported by Petrak et. al. The $KHN_{100}$ value reported in U.S. Pat. No. 3,816,586 (Goosey) is somewhat anomalous and this may be due to the presence of another phase in addition to $B_6O$. In any event, none of the researchers have reported a $KHN_{100}$ value greater than 3600 kg/mm² for boron suboxide. The densities reported by these researchers have been from 99.5 to 100% of the theoretical value. Furthermore, based on crystallographic data, most of the researchers have ascribed a rhombohedral unit cell to the boron suboxide that was produced.

While the reported hardness values are quite good, it would be desirable to produce a superhard form of boron suboxide having a hardness value which more closely approaches that of diamond which ranges from KHN of 6000 to 9000. More particularly, because the raw materials to form boron suboxide are inexpensive and the process is relatively simple, it would be desirable to produce a superhard form of boron suboxide which has an average $KHN_{100}$ hardness value of at least about 3800 kg/mm², and preferably in the range of about 4000–4500 kg/mm².

Recent crystallographic studies of $B_6O$ and $B_7$ have revealed that both possess the same crystal structure. This indicates these are the same defect phase and include all intermediate compositions. If used in a generic sense the term $B_6O$ in this application henceforth refers to any composition between $B_6O$ and $B_7O$, inclusive.

SUMMARY OF THE INVENTION

In accordance with the present invention, a new boron suboxide ($B_xO$) material is provided which comprises at least 95% by weight of $B_6O$ and has an average $KHN_{100}$ hardness value of at least about 3800 kg/mm². Preferably, the new boron suboxide material has an average $KHN_{100}$ hardness value above about 000 kg/mm2, typically about 4250 kg/mm2, which is well beyond the average hardness values previously reported for any form of boron suboxide.

According to the invention, the novel form of boron suboxide is produced by reacting stoichiometric amounts of elemental boron and boron oxide in accordance with the chemical equation:

$$16B + B_2O_3 \rightarrow 3B_6O \qquad (3)$$

under carefully controlled conditions. The reaction is carried out in a specially designed cell at a temperature of about 1900° C. to about 2100° C. and at a pressure in the range of about 3,000 to about 4,000 psi, for a sufficient time to produce a form of boron suboxide which is at least 95% by weight $B_6O$ and has an average $KHN_{100}$ hardness value of at least about 3800 kg/mm². Furthermore, while the $B_2O_3$ starting material in the above chemical equation is assumed to be essentially pure (e.g., about 99.9% pure), surprisingly it has been found that if the elemental boron used as a starting material is less than about 95% pure a $B_6O$ material which is harder than previously reported in the literature can be formed. It was found that the impure B contained about 6% Mg. It is believed that the Mg aids the sintering of the boron suboxide, so that an improved form of $B_6O$ is produced which has greater hardness. The quantity of boron used is that suggested by equation 3 and was not adjusted to compensate for its lack of purity. Transmission electron microscopic examination of this harder material reveals a more defect-free structure than previously reported forms of $B_6O$. An alternate method of producing $B_6O$ of high hardness is to use pure raw materials and separately add a suitable quantity of the desired sintering aid. Other materials such as Ca and Y are also expected to act as sintering aids.

In a further alternate method of producing superhard $B_6O$, it is possible to mix substantially pure $B_2O_3$ with substantially pure B without the inclusion of any sintering aid. It should be understood that an outer layer of boron oxide may form on the surface of the boron particles. When used in the context of this alternative method of producing superhard boron suboxide, the terms "substantially pure" and "essentially pure" boron disregard this oxide layer and are meant to convey that no sintering aid is present. In accordance with this alternate method, the boron particles are extremely small (average particle size of less than 1 micron) and an excess of boron powder is mixed with the boron oxide in order to compensate for the extra oxygen which is present in the oxide layer. The superhard $B_6O$ made by this method is homogeneous and has an average grain size of about 1-5 microns in comparison to an average grain size of 18-40 microns if made by the other methods described above. Material having an average grain size of less than 5 microns will be referred to herein as "fine grain" form of boron suboxide, while the material having an average grain size of 18-40 microns will be referred to herein as "large grain" boron suboxide.

DETAILED DESCRIPTION OF THE INVENTION

Figure 1:
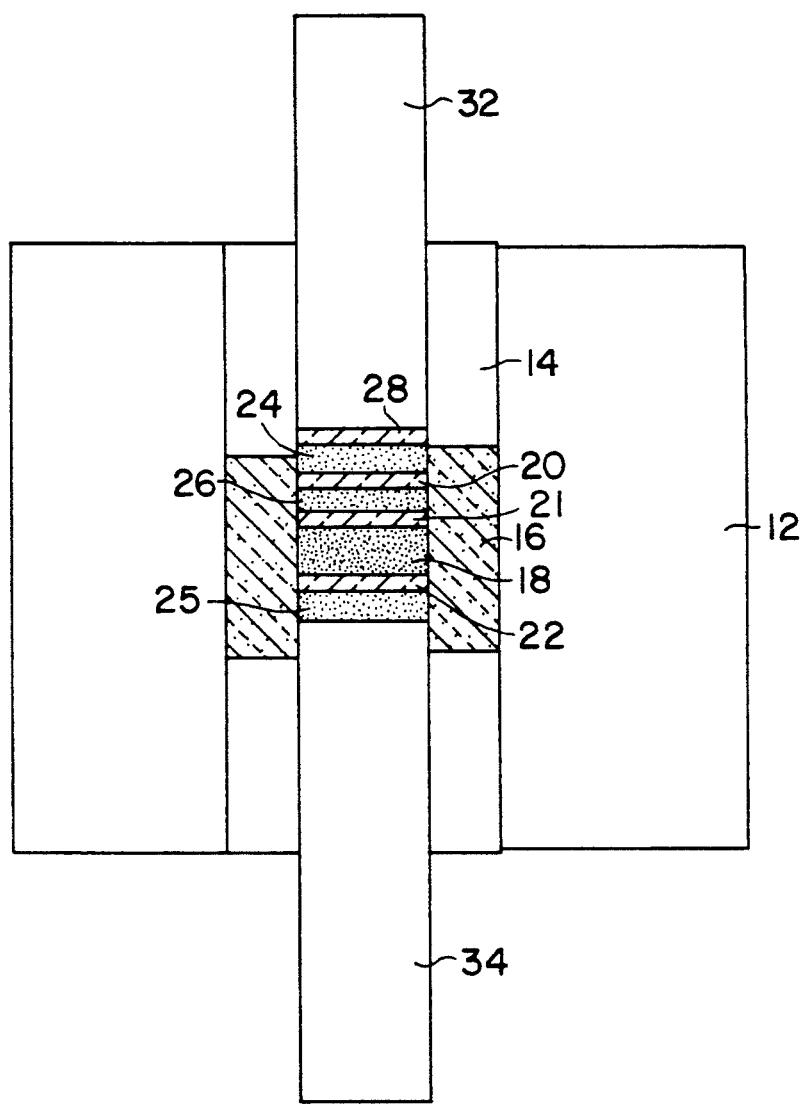
FIG. 1 illustrates the specially designed cell which is used to produce the novel form of boron suboxide.

The novel boron suboxide material of the present invention is made by hot pressing a stoichiometric mixture of elemental boron and boron oxide powders in a specially designed cell. The boron oxide ($B_2O_3$) powder is of high purity (e.g., 99.9% pure), while the elemental boron powder is desirably of lower purity (e.g., about 90-95% pure, preferably only about 90-92% pure). The main impurities in the 90-92% boron powder are Mg (ca. 5-6%), oxygen in combined form (ca. 2-3%), and small amounts of other ingredients (e.g., 0.15% Si, 0.1% Fe, 0.08% Mn, 0.05% Al, 0.01% Ca, 0.01% Cu). Desirably, the boron powder should contain at least 1% by weight of Mg or another sintering aid.

The boron and boron oxide powders are mixed together in stoichiometric proportions according to equation (3). It is important that the two powders be mixed very thoroughly and for this purpose it is desirable that the mixture be placed in a container with tungsten carbide balls as a mixing aid and hexane or other non-oxygenated dispersion liquid (⅔ by volume) and tumbled overnight to ensure intimate mixing and allow reduction in powder particle size. An alternate mixing method would be an attrition mill technique or other mixing technique to achieve the same blend in a shorter time. This slurry should be dried to evaporate any remaining hexane without altering material composition. This is followed by screening to reduce large agglomerates.

A mixture of boron and boron oxide powders prepared in this manner can be converted into the novel boron suboxide material by hot pressing the mixture at temperatures in the range of about 1800°-2200° C. and at pressures of about 2,000-6,000 psi while encapsulated by hexagonal boron nitride or another suitable barrier material, such as tantalum. For this purpose, the specially designed cell shown in FIG. 1 may be used. The cell comprises a graphite mold having outer wall 12 and inner wall 14. A cylinder 16 made from hexagonal boron nitride forms a part of the inner wall 14. The boron/boron oxide mixture 18 is positioned in the graphite mold within the hexagonal boron nitride cylinder. The boron/boron oxide mixture is then sandwiched between hexagonal boron nitride plates 21,22. The hexagonal boron nitride plates 21,22 are set between layers 25,26 of hexagonal boron nitride powder. Another mass of hexagonal boron nitride powder 24 is confined between a second set of boron nitride plates 20,28. Graphite pistons 32,34 press against the hexagonal boron nitride powder 25 and the hexagonal boron nitride plate 28 thereby compressing the boron/boron oxide mixture while encapsulated with hexagonal boron nitride or other suitable barrier.

When the components are assembled and loaded with premixed powders as described above and subjected to pressures of about 2,000 to about 6,000 psi and temperatures of about 1500° C. to about 2200° C. for periods of about 5 minutes to 3 hours, the novel boron suboxide material is formed. Typically, a 30 g sample of stoichiometric boron (90-92% pure boron)/boron oxide is subjected to a pressure of 3,240 psi and a temperature of 1960° C. for about 3 hours to form boron suboxide which is at least about 95% by weight of $B_6O$ and has an average $KHN_{100}$ hardness value of at least about 3800 kg/mm2 and more typically about 4250 kg/mm$^2$.

Since the scatter of average $KHN_{100}$ values for a given material is no more than about 25-50 kg/mm$^2$, and the average $KHN_{100}$ values of the thus produced boron suboxide material is at least about 200 kg/mm$^2$ and more typically about 650 kg/mm$^2$, greater than any previously reported value for a boron suboxide material, it is concluded that the material produced in accordance with the present invention is a new superhard form of boron suboxide. X-ray diffraction, electron microprobe analysis and transmission electron microscopy confirm that this new superhard form of boron suboxide comprises at least about 95% by weight of polycrystalline $B_6O$ and has a more perfect crystal structure with fewer defects than softer forms of boron suboxide also examined.

Boron suboxide made in this manner and having a $KHN_{100}$ hardness of at least about 3800 kg/mm$^2$ is in the form of a solid mass when it is removed from the cell. It can then be crushed into granules and sized by techniques well known to those skilled in the art. The powder can be used as an abrasive grit, or the grit can be bonded to tools which require highly abrasive surfaces, for example, grinding wheels, drill bits, machining tools, etc.

The invention will now be described by reference to the following examples.

EXAMPLE 1

A 20 g sample of boron/boron oxide powder was placed in a container containing tungsten carbide balls and hexane liquid (⅝ by volume). The 20 g sample consisted of 14.2 g of elemental boron and 5.8 g of boron oxide ($B_2O_3$). This roughly corresponds to a boron to oxygen ratio of 6: 1. The boron oxide powder was 99.99% pure, while the boron powder comprised 91.03% by weight boron, 5.76% by weight magnesium, and 2.81% by weight oxygen, the balance being trace other elements.

The powder mixture was tumbled overnight, placed in drying trays, and then baked at about 100° C. to produce a dry, thoroughly mixed sample. Twenty grams of this sample was placed in a cell similar to that illustrated in FIG. 1 and was heated at 2000° C. under a pressure of 3650 psi for about three hours to produce the new form of boron suboxide.

The boron suboxide material was in solid form as it was removed from the cell. The boron suboxide produced in this manner was given the designation NMO86.

Figure 2:
FIG. 2 is a photomicrograph of a sample of the new superhard form of boron suboxide made with magnesium sintering aid at a magnification of 1330×.

The NMO86 sample was tested for hardness with a Knoop indentor and was found to have an average $KHN_{100}$ hardness value of 3790 kg/mm$^2$. The NMO86 sample was also visually inspected under an optical microscope at a magnification of 1330×. FIG. 2 is a reproduction of the image seen through the microscope. It shows light gray areas containing primarily $B_6O$ and less than 5% Mg and W, dark gray areas containing approximately 10% B, 55% 0 and 35% Mg, and white areas containing approximately 95–96% B, 1–2% W, and 2–3 % Mg.

Figure 3:
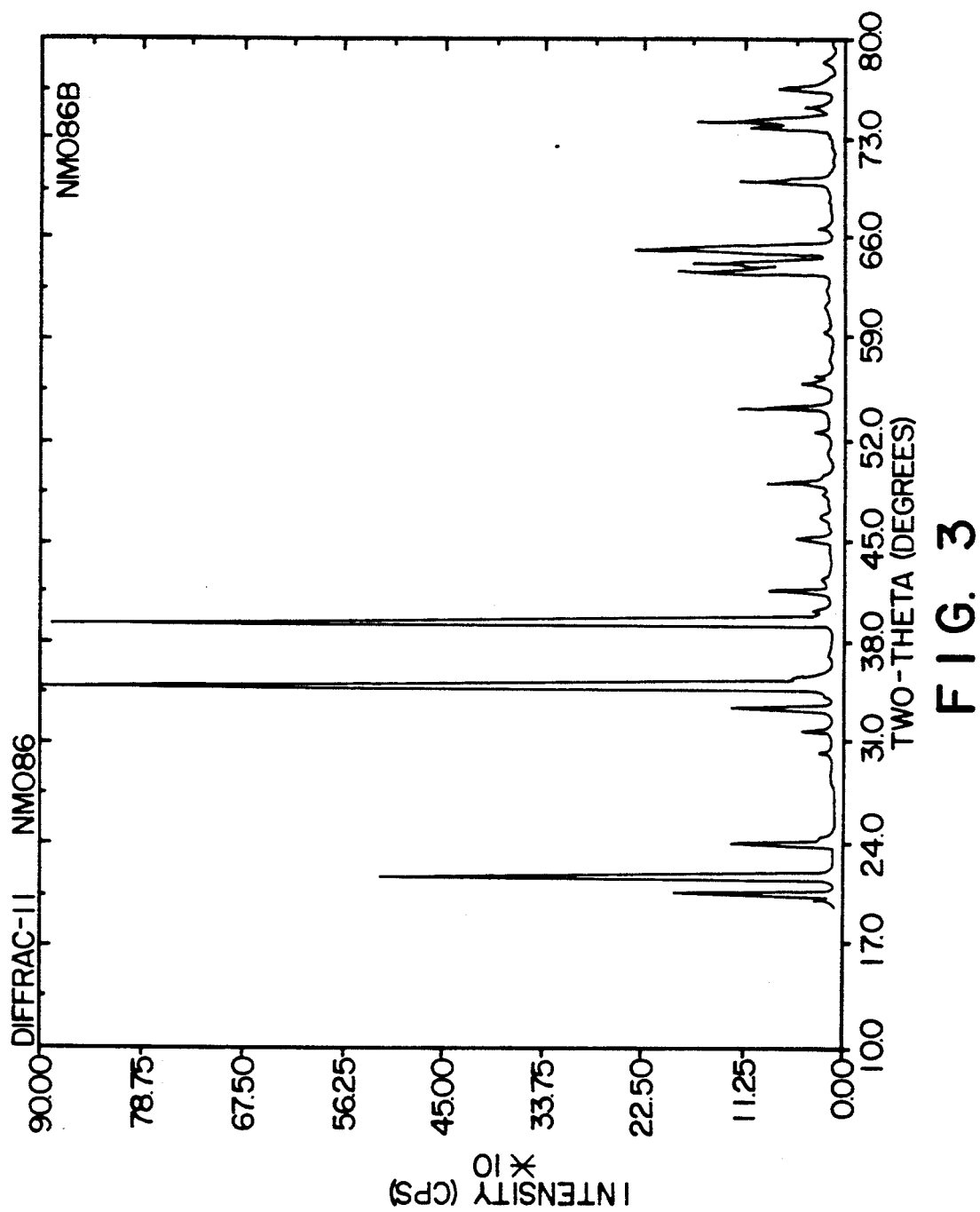
FIG. 3 is a plot of the X-ray diffraction pattern obtained with copper K-alpha radiation of the sample shown in FIG. 2.

A sample of NMO86 was also subjected to X-ray diffraction analysis. FIG. 3 shows the results that were obtained. The sharpness and position of the peaks demonstrates that the NMO86 sample consisted of a crystalline product with lattice constants of a=5.384-35A±0.00051A and c=12.3175A±0.0062A when indexed as a hexagonal unit cell. Transmission election microscopy (TEM) photographs and electron diffraction patterns of the NMO86 confirmed the presence of fewer faults in this sample than found in softer samples of $B_6O$.

It was concluded that NMO86 was a new superhard form of boron suboxide which was much harder than any previously known form of boron suboxide, and which consisted primarily of polycrystalline $B_6O$ with relatively few defects or dislocations in the material.

EXAMPLE 2

The conditions of Example 1 were repeated except that this time the boron/boron oxide sample weighed 18.5 g and was subjected to a temperature of 1960° C. at a pressure of 3241 psi for about three hours. The sample was given the designation NM138 and was tested as in Example 1.

Figure 4:
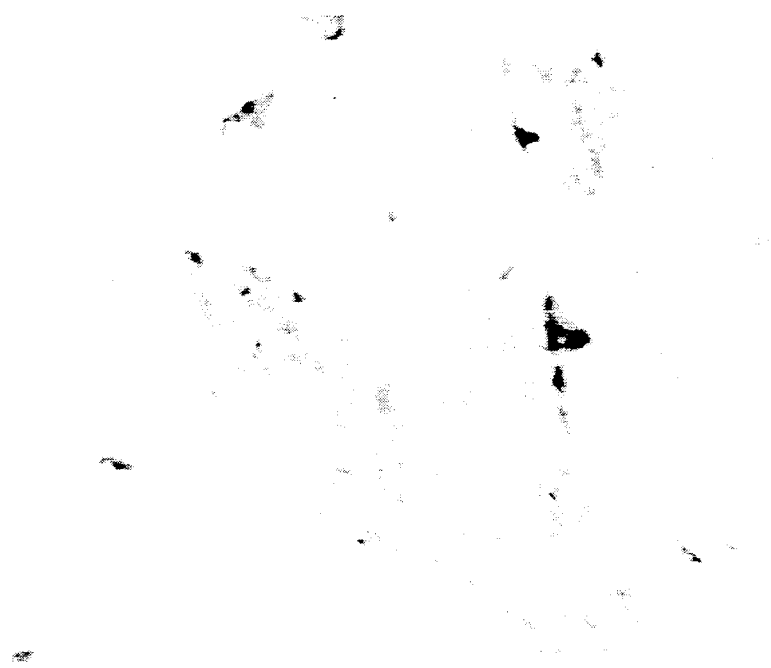
FIG. 4 is a photomicrograph of another sample of the new superhard form of boron suboxide at a magnification of 1330×.
Figure 5:
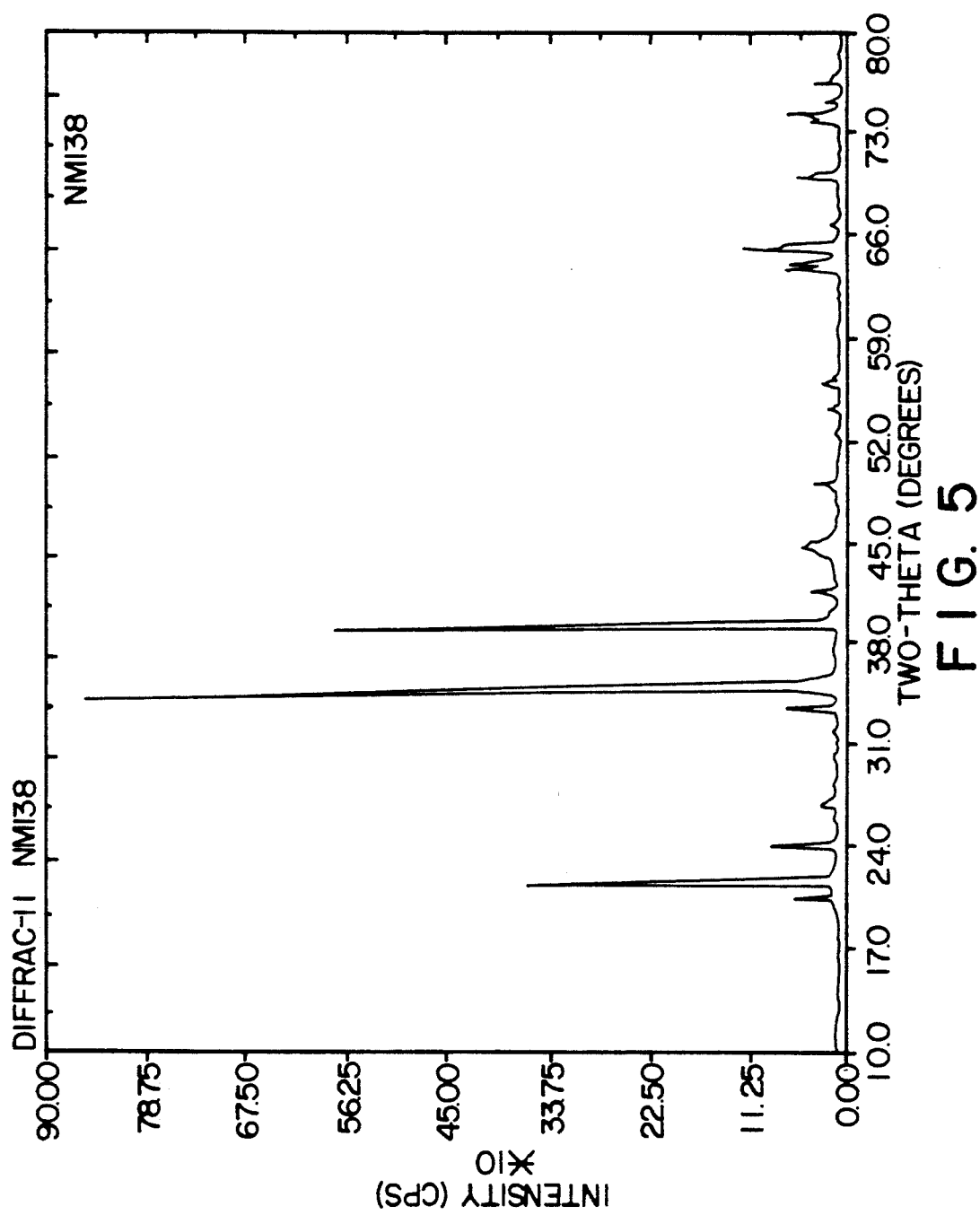
FIG. 5 is a plot of the X-ray diffraction pattern obtained with copper K-alpha radiation of the sample shown in FIG. 4.

The NM138 sample was tested for hardness with a Knoop indentor and was found to have an average $KHN_{100}$ value of about 4250 kg/mm$^2$. The sample was also inspected visually under a magnification of 1330× with an optical microscope and a photograph thereof is shown in FIG. 4. The same microstructure and constituents are seen in FIG. 4 as were seen in FIG. 2. The NM138 sample was also subjected to X-ray diffraction analysis and the results thereof are shown in FIG. 5. These tests confirm the conclusions reached in Example 1.

Figure 6:
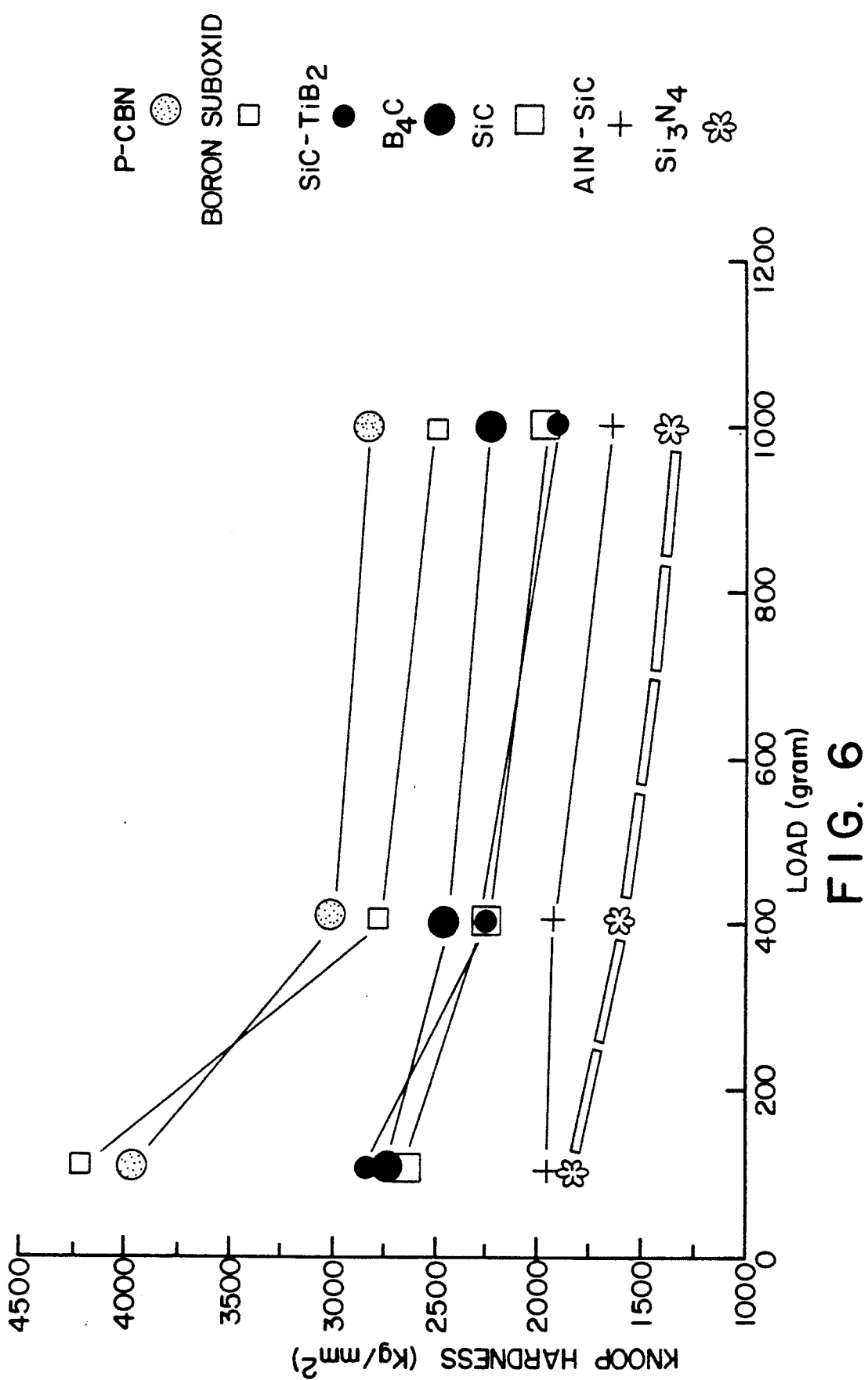
FIG. 6 is a plot of average hardness (KHN) values for a variety of materials including the new superhard form of boron suboxide.

The average Knoop hardness of the NM138 sample was measured under various loads. FIG. 6 illustrates the results obtained. Also illustrated are average Knoop hardness values that were measured for various other well-known abrasive materials under the same indentation conditions. FIG. 6 shows that the average KHN value for the NM138 sample of boron suboxide is higher than that of polycrystalline cubic boron nitride at a load of 100 g, and is much higher than the hardness values measured for all the other abrasive materials at all loads. The greater decrease in hardness of this new material at 400 g load is believed to be due to porosity or other flaws in the test material.

COMPARISON EXAMPLE 1

In order to compare the results obtained for the new superhard form of boron suboxide with previously known forms of boron suboxide, Example 1 was repeated except this time essentially pure (99.9%) elemental boron powder was mixed with pure boron oxide. In this case, the mixture was subjected to a temperature of 1960° C. and a pressure of 3200 psi for 3 hours. All other conditions were the same as in Example 1. The sample produced in this manner was given the designation NM176 and was tested as before.

Figure 7:
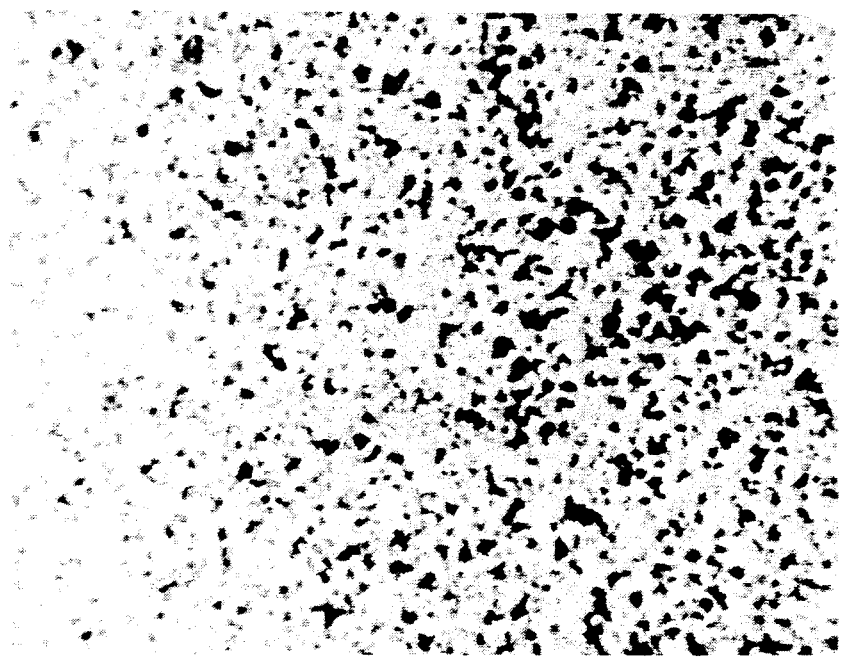
FIG. 7 is a photomicrograph at a magnification of 1330× of a comparison sample of boron suboxide which is not superhard and was made using high purity boron (99.9% B) mixed with boron oxide to $B_6O$ stoichiometry. Excess boron was not added in this case to compensate for the surface boron oxide layer on boron, nor was a sintering aid used.
Figure 8:
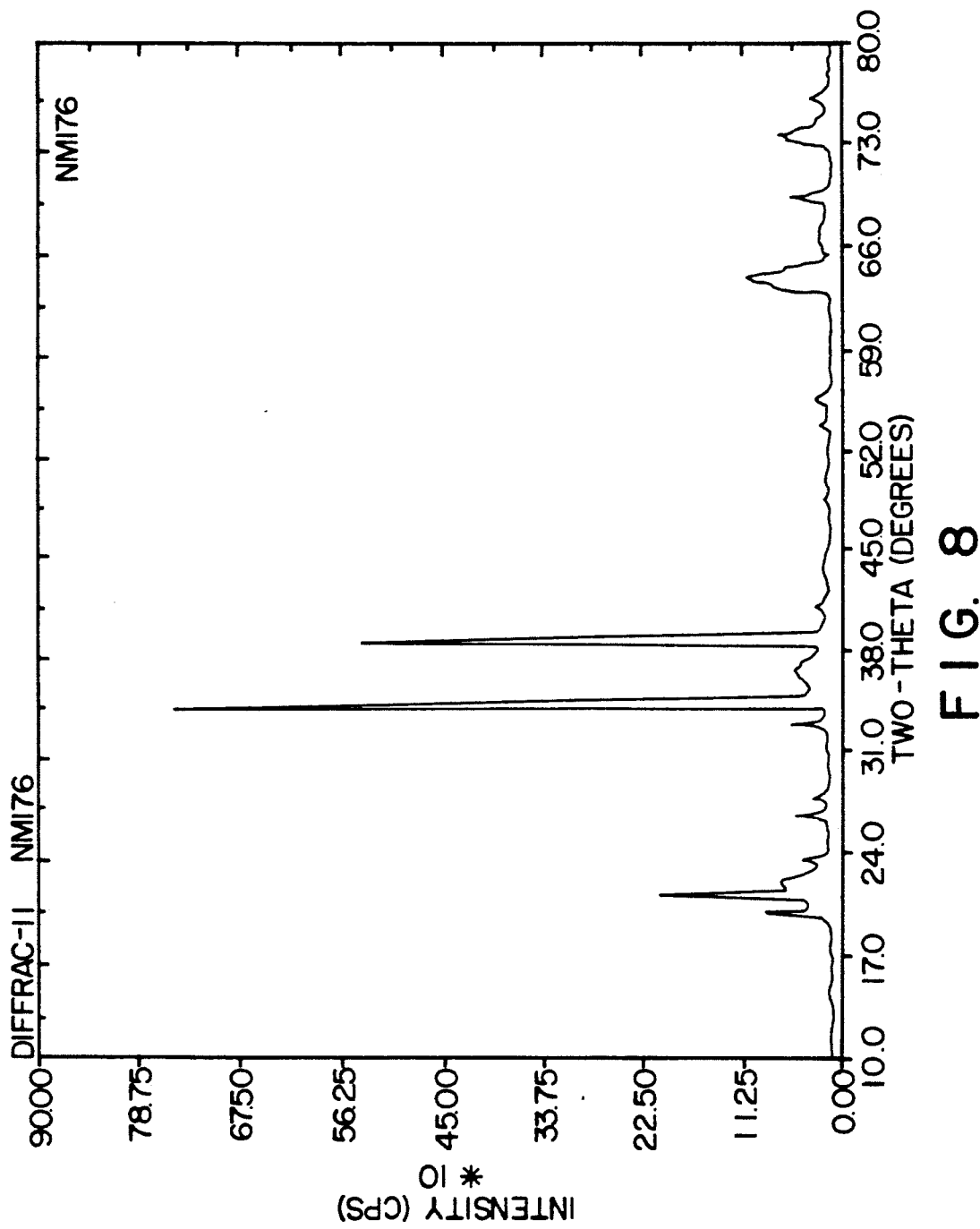
FIG. 8 is a plot of the X-ray diffraction pattern obtained with copper K-alpha radiation of the comparison sample shown in FIG. 7.

The average $KHN_{100}$ value obtained for the NM176 sample was only 1568 kg/mm$^2$. A photograph of the sample under a magnification of 1330× is shown in FIG. 7. This photograph shows the presence of considerable porosity. This indicates that the material is not well sintered. The X-ray diffraction pattern shown in FIG. 8 confirms that NM176 is not a well crystallized material as many of the peaks are broad compared with the X-ray diffraction patterns of the NMO86 and NM138 samples. This may indicate an incomplete chemical reaction and the presence of intermediate phases.

EXAMPLE 3

In another set of experiments, NMO86 samples were subjected to a friability test. The NMO86 samples were removed from the die, crushed and then sized. The grit was then subjected to a friability test. The same friability test was conducted on a sample of single crystal cBN and on an $Al_2O_3$ grit made from seeded gel.

The NMO86 material was found to have desirable friability characteristics as shown in the following table.

EXAMPLE 2

| | Friability Index (50 seconds) | | |
|---|---|---|---|
| Size (Mesh) | NM086 | cBN | $Al_2O_3$(Norton SG) |
| −60/+80 | 13 | 17 | 35 |
| −100/+120 | 46 | 37 | 62 |
| −120/+140 | 26 | 35 | 27 |

The friability index is a measure of toughness and is useful for determining the grit's resistance to fracture during grinding. The values in this table are the percent of grit retained on a screen after friability testing. This procedure consists of a high frequency, low load impact test and is used by manufacturers of diamond grit to measure the toughness of the grit. Larger values indicate greater toughness. The data show that the NMO86 material has friability characteristics similar to that of the cBN tested (BZN-I from General Electric Co.).

EXAMPLE 4

In another set of experiments, grit made from NMO86 material was subjected to a grinding test. In a first test, the NMO86 material was used in making a resin bond grinding wheel. Wet grinding of a D-2 steel workpiece was conducted at a traverse speed of 600 in./min and a crossfeed of 0.05 inches. The results for the NMO86 material and for the $Al_2O_3$ (Norton SG) are shown in Table 2.

TABLE 2

| Abrasive (Mesh) | Depth of Cut (Inches) | Grinding Ratio | Average Peak Power (Watts) |
| --- | --- | --- | --- |
| NM086 −60/+200 | 0.0003 | 17.4 | 800 |
|  |  | 18.5 | 800 |
| $Al_2O_3$(Norton SG) −60/+200 | 0.0003 | 21.7 | 590 |
|  |  | 21.2 | 640 |
| NM086 −60/+200 | 0.0005 | 13.4 | 1000 |
|  |  | 12.6 | 1160 |
| $Al_2O_3$(Norton SG) −60/+200 | 0.0005 | 24.7 | 700 |
|  |  | 24.6 | 660 |

A similar vitreous bond grinding wheel test was conducted using another sample of NM086 material. In this case, the workpiece was 52100 steel and the infeed was 0.001 inches/second. The results are shown in Table 3.

TABLE 3

| Abrasive (Mesh) | Grinding Ratio | Average Peak Power (Watts) |
| --- | --- | --- |
| NM086 −100/+230 | 4.2 | 3160 |
| cBN −100/+230 (BZN-I) | 284 | 2465 |
| $Al_2O_3$(Norton SG) −100/+230 | 227 | 1704 |

The results from the grinding experiments demonstrate that $B_6O$ having a $KNH_{100}$ value of at least about 3800 kg/mm$^2$ can act as an abrasive grit. However, the results of the tests shown in Table 3 are somewhat disappointing in comparison to cBN and $Al_2O_3$ (Norton SG). More recent experiments have shown that the reason $B_6O$ was sometimes inferior to cBN and $Al_2O_3$ (Norton SG) is because of oxidation of the $B_6O$ at high temperatures.

EXAMPLE 5

In an A1390 turning test a $B_6O$ cutting tool insert (SNE433) performed similarly to a $Si_3N_4$ insert with the same geometry.

EXAMPLE 6

In the previous examples, the novel superhard boron suboxide material (e.g., samples NMO86 and NM138) was prepared from a mixture of essentially pure 99.99% boron oxide powder and boron powder of relatively low purity (90–92%), the main impurity in the boron powder being magnesium which is believed to act as a sintering aid. The average particle size of the boron powder was somewhat less than 5 microns. Furthermore, the low purity boron and high purity boron oxide were mixed in proportions so as to provide a mixture containing 6 parts B:1 part O. When processed as described above, the final product was superhard boron suboxide having an average grain size of 18–30 microns, interspersed with a small amount (less than 5%) of magnesium borate, and some free boron.

Through subsequent research it has been found that an improved form of fine grain superhard boron suboxide can be prepared. This improved form of superhard boron suboxide comprises a homogeneous composition of $B_6O$ throughout, and has a grain size of approximately 1 to 3 microns. This fine grain form of superhard boron suboxide was prepared by mixing as described earlier high purity (99.9%) boron oxide with high purity (99.9%) boron powder having an average particle size of less than 1 micron in a proportion so as to provide 12 parts B:1 part O. The excess boron was needed in order to compensate for a boron oxide layer which formed on the surface of the boron particles. Without the addition of any sintering aid, the mixture of boron and boron suboxide was then loaded into the reaction cell illustrated in FIG. 1 and subjected to a temperature of 2100° C. and a pressure of 3500 psi for 20 minutes.

Figure 9:
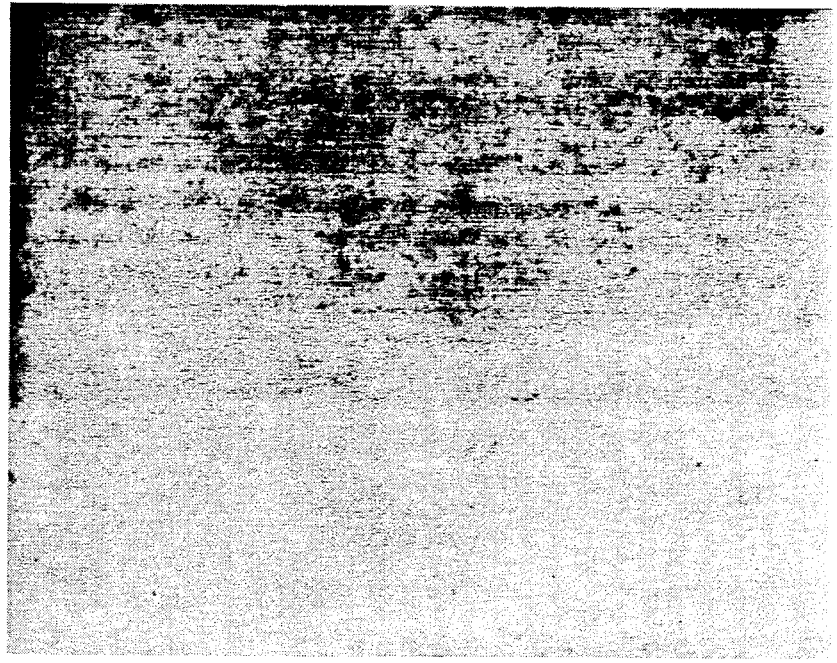
FIG. 9 is an unetched photomicrograph at a magnification of 1330× of a fine grain form of the new superhard boron suboxide.

FIG. 9 is a typical photomicrograph of the product prepared in this way. It consists of a fine grain $B_6O$ with less than 10% of an unidentified boron-rich base. The $KHN_{100}$ hardness values measured for the fine grain boron suboxide ranged from 3853 kg/mm2 to 4288 kg/mm$^2$.

Figure 10:
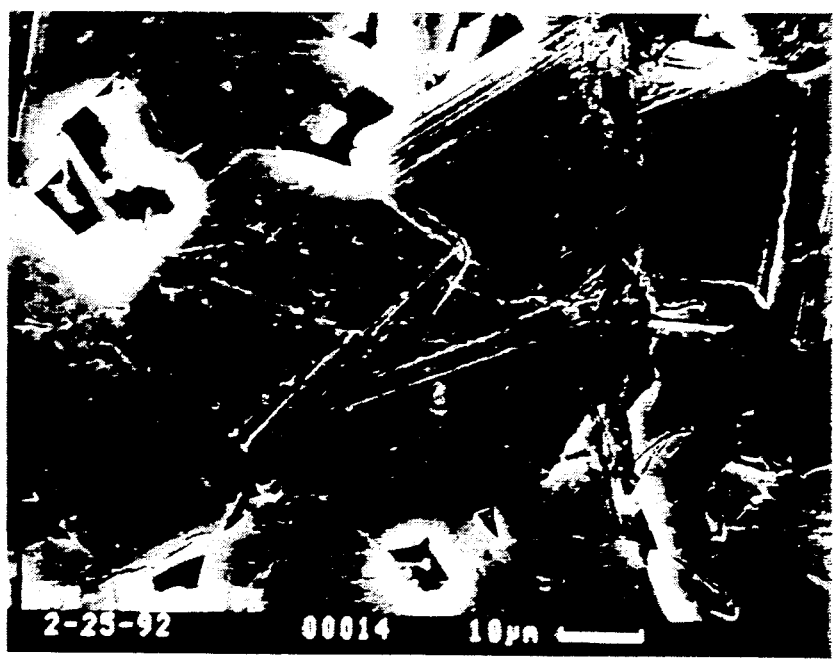
FIG. 10 is an etched photomicrograph at a magnification of 1000× of large grain boron suboxide.
Figure 11:
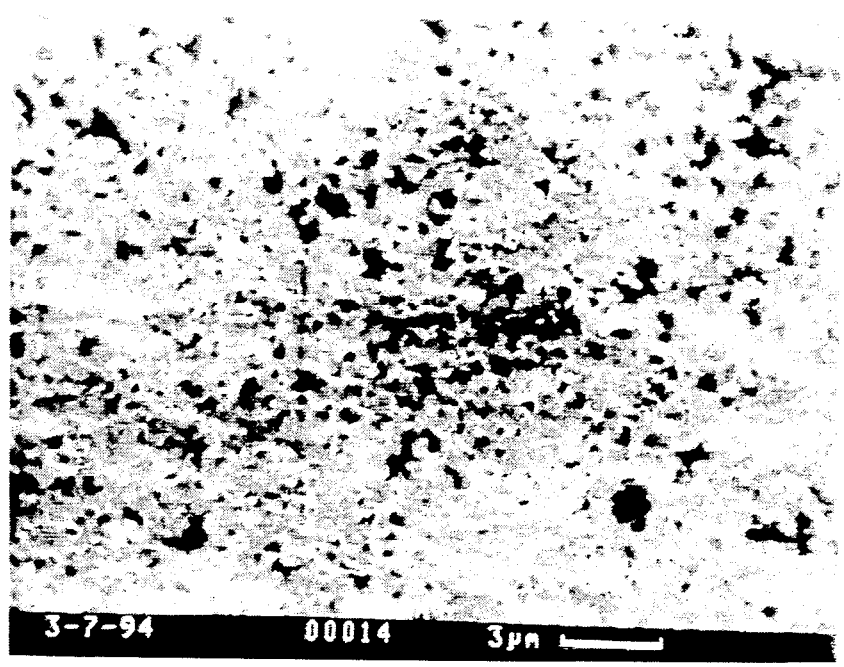
FIG. 11 is an etched photomicrograph at a magnification of 4500× of fine grain boron suboxide.

FIGS. 10 and 11 show the difference in grain size between the large grain and the fine grain boron suboxide materials. The large grain boron suboxide shown in FIG. 10 has an average grain size of approximately 18–30+microns, while the fine grain boron suboxide shown in FIG. 11 has an average grain size of approximately 1–5 microns.

Figure 12:
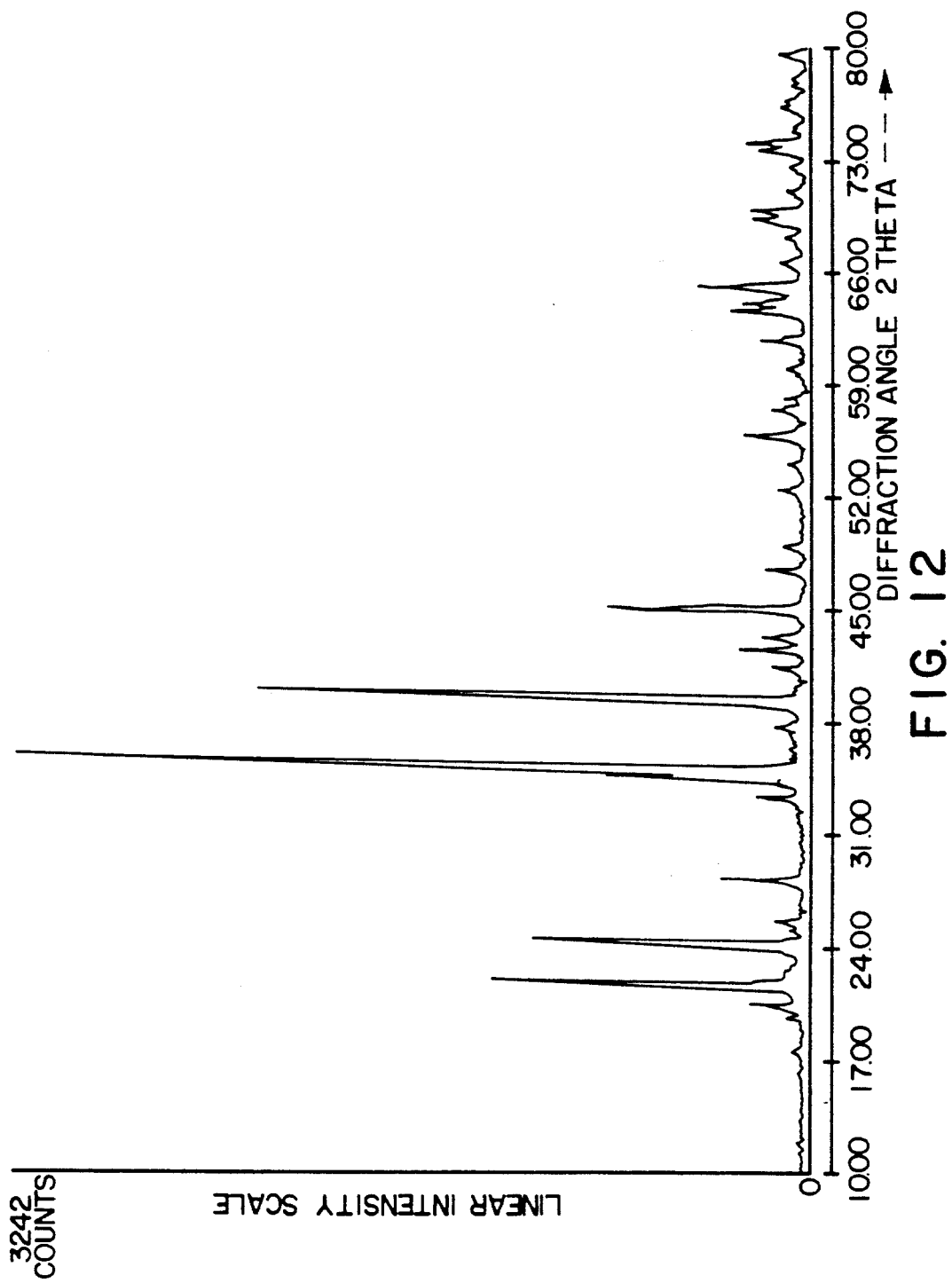
FIG. 12 is a plot of the X-ray diffraction pattern obtained with copper K-alpha radiation of fine grain boron suboxide.
Figure 13:
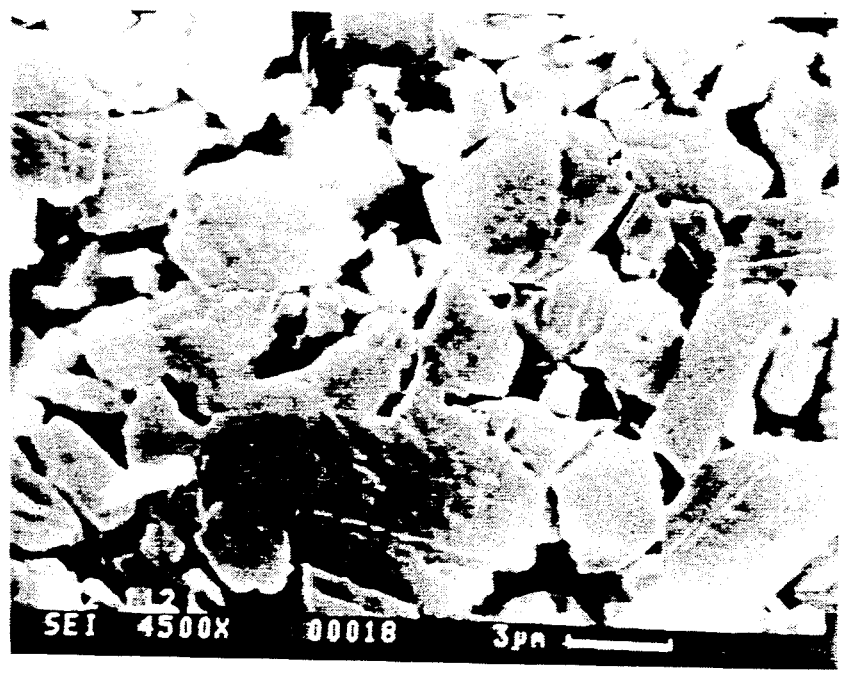
FIG. 13 is an etched photomicrograph at a magnification of 1330× of the novel boron suboxide material made by a hot isostatic pressing method.

FIG. 12 shows an X-ray diffraction pattern for the fine grain boron suboxide. Differences in the X-ray diffraction patterns may also be observed.

EXAMPLE 7

An experimental design was also conducted wherein the factors pressure, temperature, boron to oxygen ratio and purity of boron powder were examined to determine their effects on hardness. Pressure was found to affect hardness the least, i.e., hard materials could be produced over a range of pressures. As a result of this finding, it is postulated that it may also be possible to produce $B_6O$ materials with hardness greater than $KHN_{100}=3800$ kg/mm2 with other apparatuses which are capable of operating at pressures greater than 6000 psi (for example pressures up to 50,000 psi which are typical of hot isostatic pressing.)

Up to now, all of the methods described for producing superhard boron suboxide involved hot pressing of boron and boron oxide powders along an axial direction in a cell such as that shown in FIG. 1. It has also been discovered that superhard boron suboxide can be produced in a hot isostatic pressing process similar to that described in U.S. Pat. No. 4,446,100 (Adlerborn et. al.) According to this process, a mixture of substantially pure boron (99.9%) and boron oxide (99.9%) in a stoichiometric ratio of 12 parts B:1 part O as described in connection with Example 5 was first cold isostatic pressed to form a green body product. The green body product was then coated with a 2–3 mm boron nitride layer (containing BN, alcohol, and organic binder).

Subsequent layers 2-3 mm thick of combined boron nitride and silicon carbide, boron nitride, and combined boron nitride and silicon carbide were also applied. The sample was then encapsulated in glass and subjected to hot isostatic pressing as described in U.S. Pat. No. 4,446,100. The hot isostatic pressing was performed at a temperature of 1950° C. and a pressure of 30,000 psi for 30 minutes.

Fine grain boron suboxide having an average Knoop hardness $KHN_{100}$ of 3804 kg/mm² was produced by this method. The fine grain boron suboxide produced by this method closely resembled the fine grain boron suboxide produced by the hot pressing method described in Example 6. However, the boron suboxide made by hot isostatic pressing was comprised of grains ranging from approximately 0.1 to 0.5 microns which is substantially smaller than the average grain size of the hot pressed material.

While the invention has been described by reference to specific embodiments, this was for purposes of illustration only. Numerous alternative embodiments which are within the scope of the invention will be apparent to those skilled in the art.

We claim:

1. A superhard boron suboxide material having a $KHN_{100}$ value of at least about 3800 kg/mm² and an average grain size of approximately 0.1-40 microns.

2. The boron suboxide material of claim 1 which has an average grain size of approximately 0.1-5 microns.

3. A superhard boron suboxide material having a $KHN_{100}$ value of at least about 3800 kg/mm² and an X-ray diffraction pattern substantially as shown in FIG. 12.

4. A method of making a superhard boron suboxide material, comprising
   mixing a boron oxide ($B_2O_3$) powder with a boron powder to form a mixture, said boron powder comprising about 90 to about 95% by weight of elemental boron (B) and at least about 2% by weight of a sintering aid, and
   subjecting said mixture to a temperature of about 1500° C. to about 2200° C. and a pressure and time sufficient to produce a boron suboxide material having a $KHN_{100}$ value of at least about 3800 kg/mm².

5. The method of claim 4 wherein said pressure is at least about 2,000 psi.

6. The method of claim 4 wherein said mixture comprises sufficient amounts of boron and boron oxide so as to form $B_6O$.

7. The method of claim 4 wherein said mixture is pressed while encapsulated with boron nitride, Ta or other suitable barrier material.

8. The method of claim 4 wherein said sintering aid comprises Mg or other Group IIA elements and oxides thereof.

9. The method of claim 4 wherein said boron powder comprises at least about 1% by weight of Mg as the sintering aid.

10. The method of claim 4 wherein relatively pure $B_2O_3$ and B are used in sufficient quantities and mixed with said sintering aid which is added as a separate ingredient.

11. A method of making a superhard boron suboxide material, comprising
    mixing a boron oxide ($B_2O_3$) powder with a boron powder to form a mixture, and
    subjecting said mixture to a temperature of about 1500° C. to about 2200° C. and a pressure and time sufficient to produce a boron suboxide material having a $KHN_{100}$ value of at least about 3800 kg/mm.

12. The method of claim 11 wherein said boron powder is substantially pure.

13. The method of claim 11 wherein said boron oxide is substantially pure.

14. The method of claim 11 wherein said mixture contains substantially no sintering aid.

15. The method of claim 11 wherein said boron powder has an average particle size of about 5 microns or less.

16. The method of claim 11 wherein said boron powder has an average particle size of about 1 micron or less.

17. The method of claim 11 wherein said boron suboxide has an average grain size of about 0.1-5 microns.

18. The method of claim 11 wherein said mixture is subjected to hot pressing along an axial direction.

19. The method of claim 11 wherein said mixture is subjected to hot isostatic pressing.

* * * * *